US005282407A

United States Patent [19]

Arikita

[11] Patent Number: 5,282,407

[45] Date of Patent: Feb. 1, 1994

[54] LEAKAGE PREVENTIVE DEVICE COMBINED WITH AUTOMATIC SHEET CUTTING APPARATUS

[75] Inventor: Reiji Arikita, Wakayama, Japan

[73] Assignee: Shima Seiki Mfg., Ltd., Wakayama, Japan

[21] Appl. No.: 957,843

[22] Filed: Oct. 8, 1992

[30] Foreign Application Priority Data

Oct. 8, 1991 [JP] Japan ................................ 3-260368

[51] Int. Cl.[5] ........................ B65G 15/18; D06H 7/00

[52] U.S. Cl. ........................................ 83/422; 83/152; 83/451; 83/941; 198/689.1

[58] Field of Search ................. 83/100, 936, 937, 938, 83/939, 940, 941, 152, 422, 451, 155; 198/689.1, 811; 269/21

[56] References Cited

U.S. PATENT DOCUMENTS 4,218,125 8/1980 Silversberg .................... 198/811 X
4,322,993 4/1982 Stumpf ................................ 83/422
4,345,496 8/1982 Pearl .................................... 83/100
4,476,756 10/1984 Pearl et al. ........................... 83/422
4,528,878 7/1985 Gerber ............................. 83/941 X
4,646,911 3/1987 Pearl et al. ...................... 198/689.1
4,674,626 6/1987 Adcock .............................. 198/811
5,001,954 3/1991 Galan et al. .......................... 83/451

*Primary Examiner*—Eugenia Jones

*Attorney, Agent, or Firm*—Edwin E. Greigg; Ronald E. Greigg

[57] ABSTRACT

The present invention relates to an automatic sheet cutting apparatus which cuts off a sheet like a knit or a woven fabric into a predetermined shape and more particularly to a vacuum air leakage preventive device combined with an automatic sheet cutting apparatus so that a vacuum air can be prevented from leaking through a clearance between a bottom surface of one of those brush-mounting bases aligned in parallel with a pair of endless chains and a top surface of the main body of the automatic sheet cutting apparatus. The vacuum leakage preventive device includes a shielding member on a movable arm which is movable into place relative to the main body and the brush-mounting bases to prevent a break in a vacuum which pulls the material to be cut onto the main body relative to a cutter.

8 Claims, 7 Drawing Sheets

LEAKAGE PREVENTIVE DEVICE COMBINED WITH AUTOMATIC SHEET CUTTING APPARATUS

BACKGROUND OF THE INVENTION

The present invention relates to an automatic sheet cutting apparatus which cuts off a sheet like a knit or a woven fabric into a predetermined shape. More particularly, the invention relates to a vacuum air leakage preventive device combined with an automatic sheet cutting apparatus so that evacuated air can be prevented from leaking through a clearance between a bottom surface of one of any brush-mounting bases aligned in parallel with a pair of endless chains and a top surface of the main body of the automatic sheet cutting apparatus.

Any of those conventional chain-driven automatic sheet cutting apparatuses is provided with a number of brush-mounting bases which are aligned on a top surface of a sheet cutting table in parallel with a pair of endless chains installed on both sides of the main body of the automatic sheet cutting apparatus by way of being suspended on them. These brush-mounting bases sequentially move themselves relative to the rotation of a pair of endless chains. In the same way, a number of brushes secured on respective bases move themselves in conjunction with a cuttable sheet. Next, a control system stops the rotation of these endless chains at a predetermined position, and then activates a suction unit below the main body of the automatic sheet cutting apparatus to position the objective sheet on those brushes via a number brushes and those brush-mounting bases before permitting a cutting unit to cut the sheet on a cutting table surface into a predetermined shape by moving the cutting unit to the cutting position.

On the other hand, since there is substantial space between a pair of endless chains on both sides of the automatic sheet cutting apparatus, a supporting member is disposed on the main body of the automatic sheet cutting apparatus so that a number of brush-mounting bases aligned in parallel with and being suspended on these endless chains can slide themselves on the supporting member. This in turn results in an increased resistance against the sliding movement of those brush-mounting bases, and therefore, the apparatus needs to provide such a drive motor having substantial drive capacity.

Therefore, in order to solve this problem, any conventional automatic sheet cutting apparatus is provided with sliding members or rollers below respective brush-mounting bases to shift those brush-mounting bases by causing those sliding members or rollers to slide or roll themselves on the supporting member.

Nevertheless, when these sliding members or rollers installed below those brush-mounting bases on the supporting member of the automatic sheet cutting apparatus slide or roll themselves on the supporting member, a narrow clearance is generated between the bottom surface of those brush-mounting bases and the supporting member. In consequence, when operating a suction unit to pneumatically evacuate a cuttable sheet on those brushes via those brush-mounting bases and brushes, evacuated air leaks out of this clearance, thus resulting in a lowered efficiency.

Therefore, an object of the invention is to fully solve those technical problems inherent in any of those conventional automatic sheet cutting apparatuses by providing a novel system for preventing evacuated air from leaking out of a clearance between the bottom surface of each brush-mounting base aligned on a pair of endless chains and the top surface of the main body of the automatic sheet cutting apparatus.

SUMMARY OF THE INVENTION

To achieve the above object, the invention hereby provides a novel device combined with an automatic sheet cutting apparatus. The device embodied by the invention securely prevents air from leaking out of a clearance between the top surface of the main body of the automatic sheet cutting apparatus and the bottom surface of the brush-mounting base stopping at the ends of a pair of endless chains by providing a clearance shielding means for properly shielding the clearance.

DETAILED DESCRIPTION OF THE PREFERRED EMBODIMENTS

Referring now to FIGS. 1 through 7, details of the vacuum air leakage preventive device according to an embodiment of the invention are described below.

Figure 1:
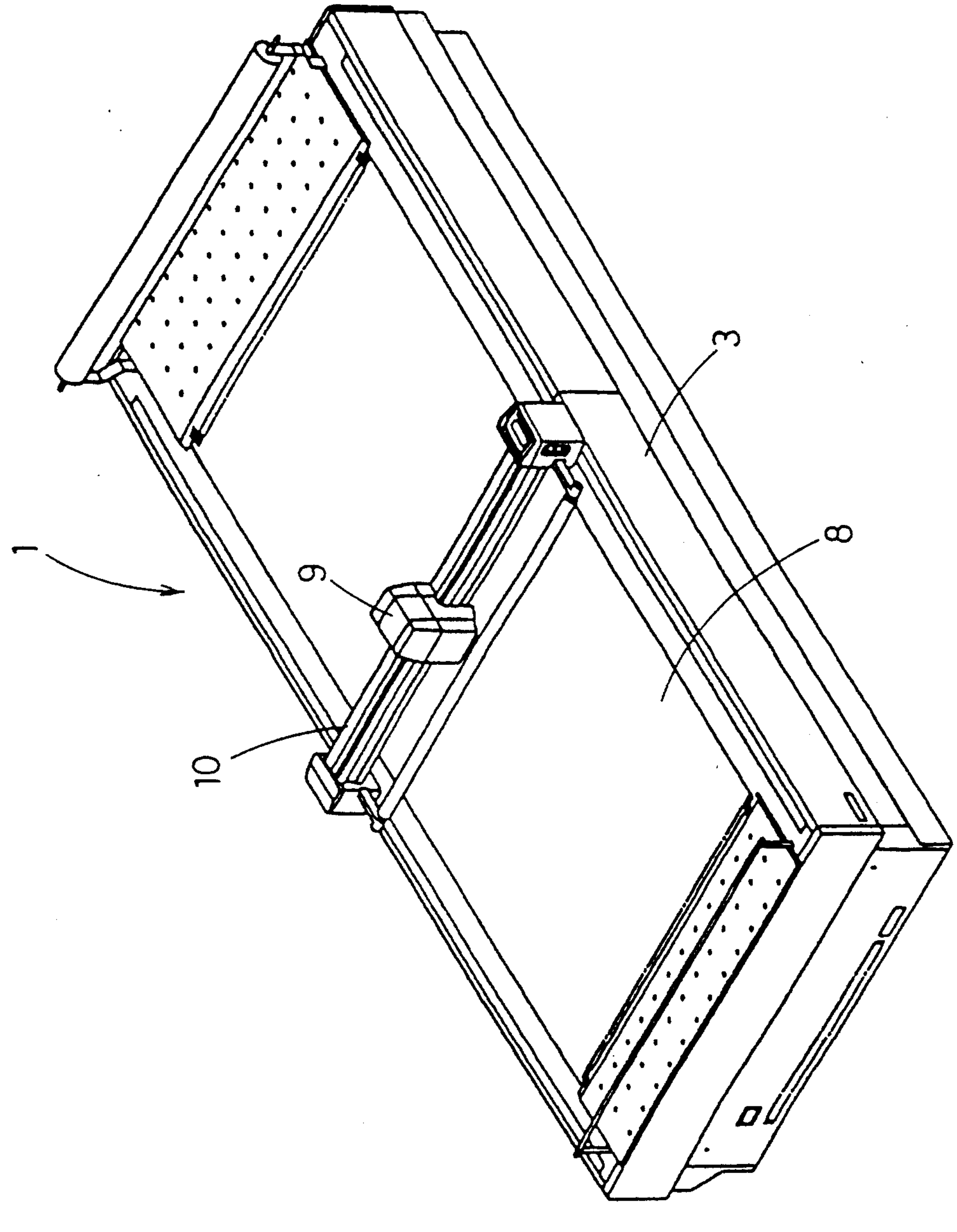
FIG. 1 is an overall perspective view of an automatic sheet cutting apparatus combined with an evacuated air leakage preventive device according to an embodiment of the invention.
Figure 2:
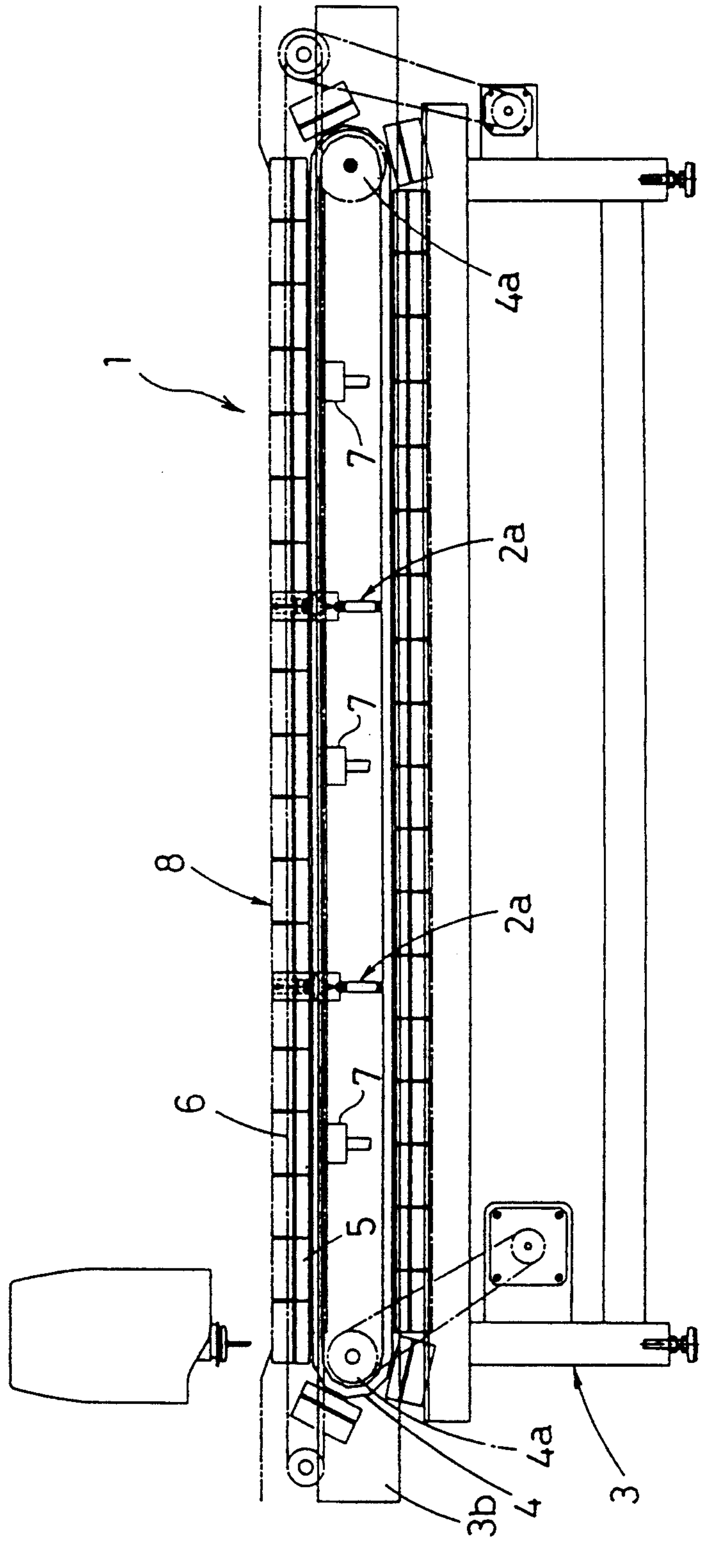
FIG. 2 is a side view showing the location of a clearance shielding means provided for the leakage preventive device embodied by the invention combined with an automatic sheet cutting apparatus.
Figure 3:
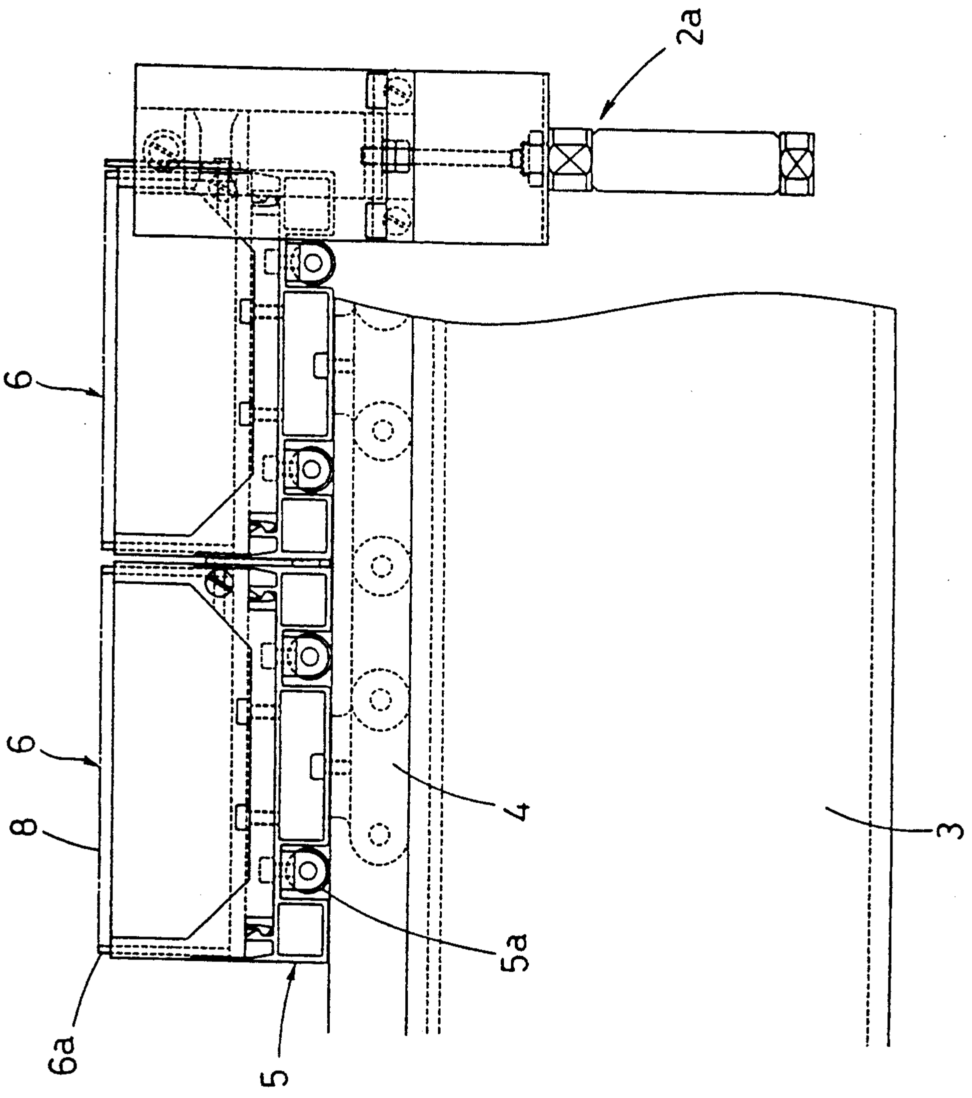
FIG. 3 is an enlarged view of the body to which the clearance shielding device is secured.

The reference numeral 1 designates an automatic sheet cutting apparatus which is combined with a vacuum air leakage preventing device (shown in FIG. 4 through 7) according to an embodiment of the invention. As shown in FIG. 2, a pair of endless chains 4 and 4 are provided on both longitudinal sides of the main body 3 of the automatic sheet cutting apparatus 1 in such a manner being engaged with two pairs of sprockets 4a across a predetermined interval. A number of brush-mounting bases 5 are installed on both endless chains 4 in parallel with each other in a suspended manner on these endless chains 4. A number of brushes 6 are respectively secured to the corresponding brush-mounting bases 5 in a succession.

A surface 8 available for supporting a cuttable sheet is composed of a large number of rigid hairs 6a provided for each brush unit 6. In addition, a large number of air vents (not shown) are provided for each base 5 and each brush 6. A plurality of suction or vacuum units 7 are installed below those brush-mounting bases 5 in order to pneumatically draw a cuttable sheet mounted on the surface 8 toward the surface 8. A plurality of shielding devices **2*a* are installed on the upper frame of the main body 3 of the automatic sheet cutting apparatus 1 between predetermined intervals, where these shielding devices 2*a* respectively divide air-evacuation areas between predetermined spacewise intervals. When activating operation of those shielding devices 2*a*, longitudinal surfaces of those brush-mounting bases 5 and brushes 6 in a predetermined location are shielded to divide a plurality of brush-mounting bases 5 and brushes 6 into several blocks so that those suction units 7** can attract a sheet to be cut.

A plurality of rollers **5*a* (shown in FIGS. 3 through 5) are rotatably installed to respective brush-mounting bases 5. These rollers 5*a* roll themselves on the top surface 3*a* of the main body 3 of the automatic sheet cutting apparatus 1 in association with those endless chains 4 to permit each base 5 to move on itself without causing the bottom surface 5*b* to come into contact with the top surface 3*a* of the main body 3**.

Above the surface 8, a cutter device 9 movable in the lateral direction is supported and disposed on a lateral frame support 10 movable in the longitudinal direction. By the lateral move of the cutter device 9 and the longitudinal movement of the lateral frame support 10, the cutter device moves to a desired position on the surface 8.

Figure 4:
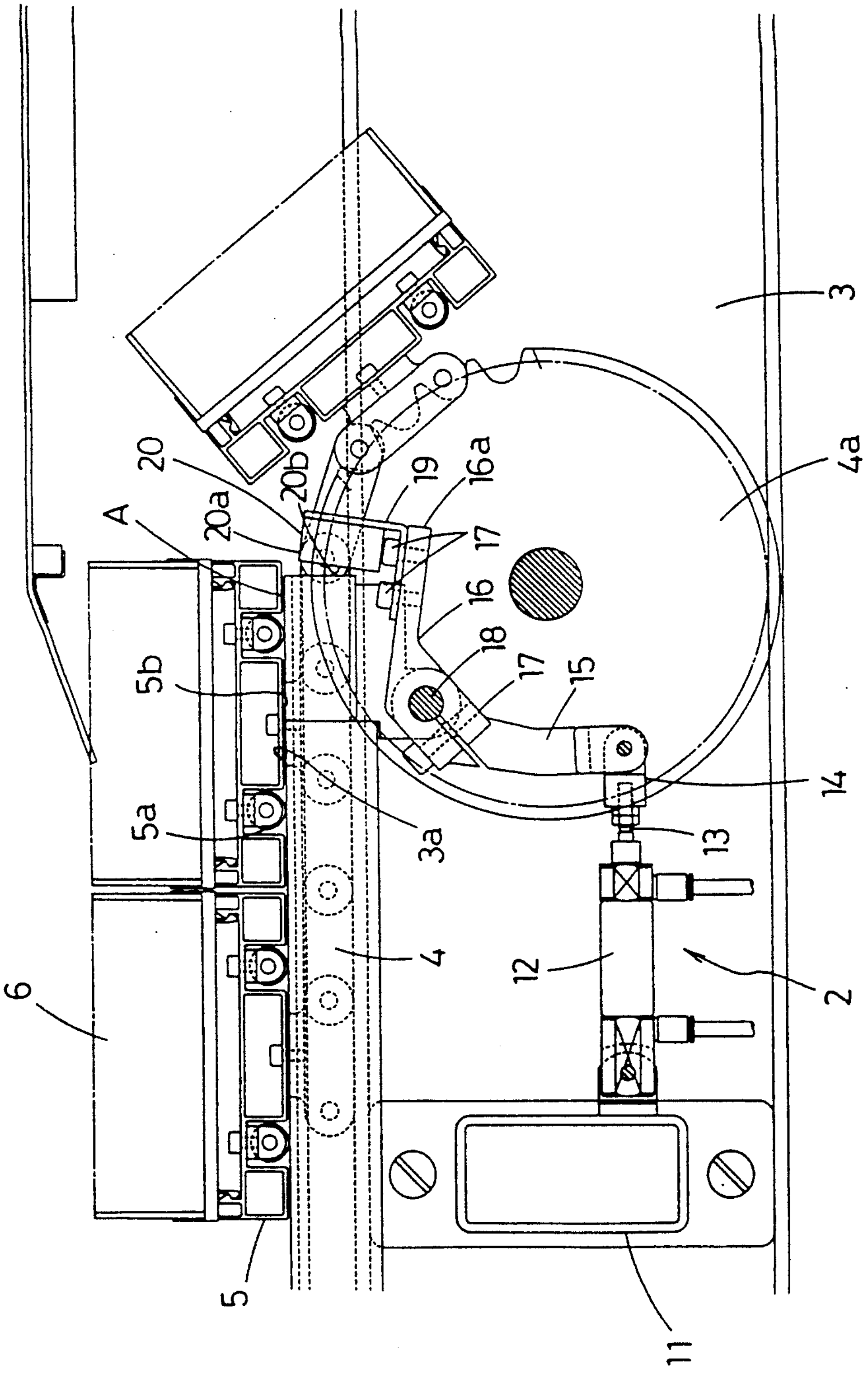
FIG. 4 illustrates the location of the leak preventive device installed to an end of the automatic sheet cutting apparatus related to the invention.
Figure 5:
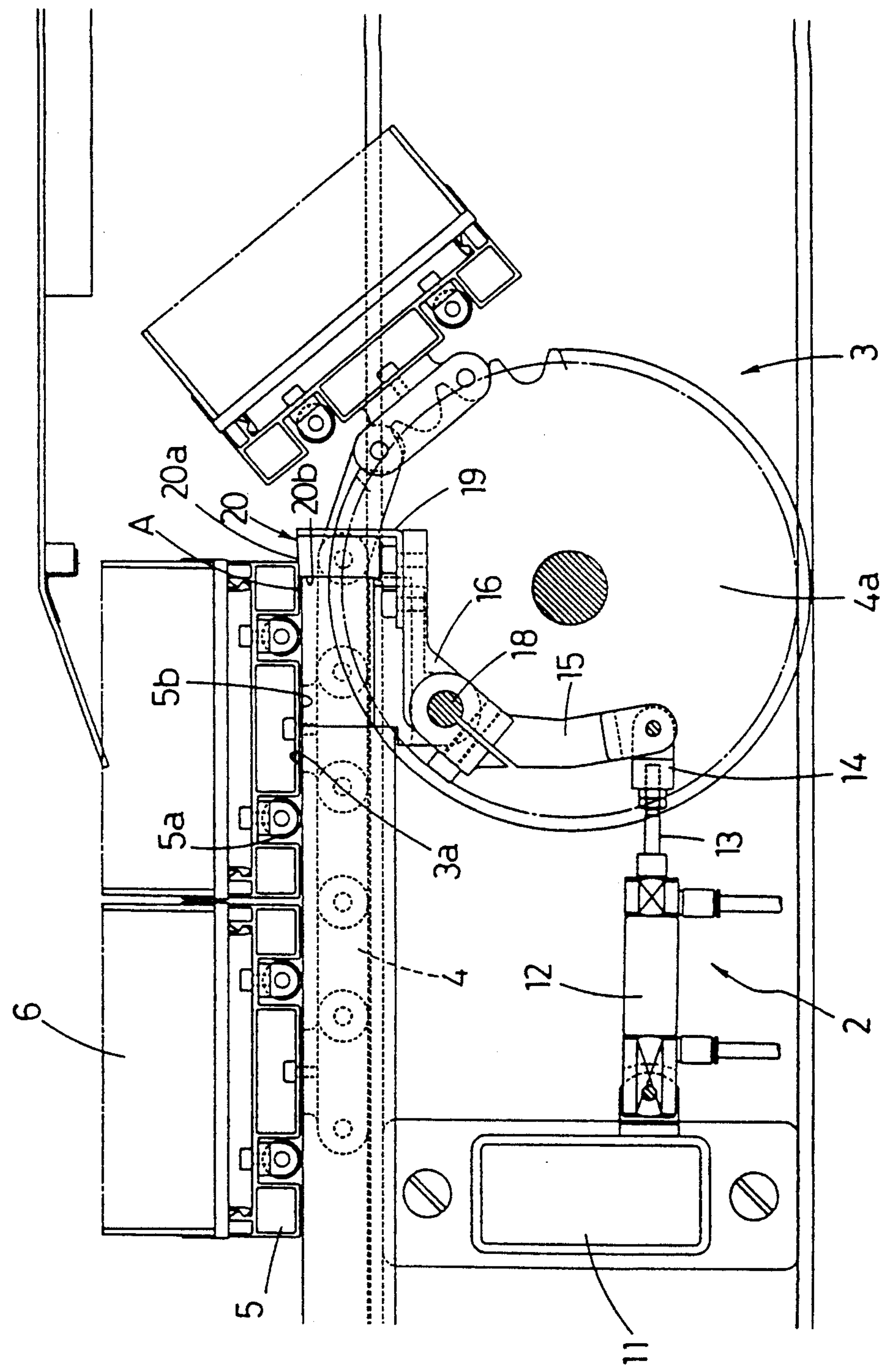
FIG. 5 illustrates a pneumatic cylinder operated at a leak-preventive-device securing member which is installed to an end of the automatic sheet cutting apparatus related to the invention.

A vacuum-air leakage preventive device 2 is secured to a position below an end of the main body 3 of the automatic sheet cutting apparatus 1 being close to one end of those endless chains 4. The leakage preventive device 2 shields the neighborhood of an end of the main body 3 of the automatic sheet cutting apparatus 1. Concretely, as shown in FIGS. 4 and 5, a transverse frame member 11 is installed below an end of the main body 3 of the automatic sheet cutting apparatus 1. The rear end of a pneumatic cylinder 12 is secured to the transverse frame member 11. A connecting member 14 is secured to the tip of a rod 13 of the pneumatic cylinder 12, and yet, an end of a swing lever 15 is pivotally installed. A supporting member 16 is secured to the other end of the swing lever 15 by means of a screw 17 at a predetermined angle. A peripheral part of a connecting body between the swing lever 15 and the supporting member 16 is swingably held by a supporting shaft 18 provided for the main body 3 of the automatic sheet cutting apparatus 1. The tip 16 a of the supporting member 16 projects in a slightly backward or forward direction beyond an end of the top surface **3*a* of the main body 3 of the automatic sheeting cutting apparatus 1. An L-shaped member 19 is secured to the top surface of an end of the supporting member 16 by means of a screw 17. A clearance shielding member 20 is secured to a lateral surface of the L-shaped member 19**.

By virtue of the provision of the vacuum-air leakage preventive device 2 in combination with the automatic sheet cutting apparatus 1, simultaneous with the stopping of the rotation of a pair of endless chains 4 which are respectively provided with a number of brush-mounting bases 5 aligned in parallel on those endless chains 4, one of those brush-mounting bases 5 comes to a stop at a position right above the rear-end sprockets **4*a* (the predetermined stop position) of those endless chains 4**.

When one of those brush-mounting bases 5 fully stops, the pneumatic cylinder 12 is activated to project the rod 13 to contact connecting member 14. Concurrent with this operation, the connecting member 14, the swing lever 15, and the supporting member 16 respectively start to operate. As a result, the above identified clearance shielding member 20 secured to the support member 16 via the L-shaped member 19 shifts itself from an external direction to a position "A" without any clearance between the top surface 3A of the main body 3 of the automatic sheet cutting apparatus 1 and the bottom surface **5*b* of the specific brush-mounting base 5 stopping at one end of the endless chains 4. This in turn permits the top surface 20*a* of the clearance shielding member 20 to come into contact with the bottom surface 5*b* of the stopped brush-mounting base 5, and yet, causes the lateral surface 20*b* of the clearance shielding member 20 to come into contact with an end of the top surface of the main body 3 of the automatic sheet cutting apparatus 1. As a result, the clearance "A" is securely shielded by the clearance shielding member 20**.

Figure 6:
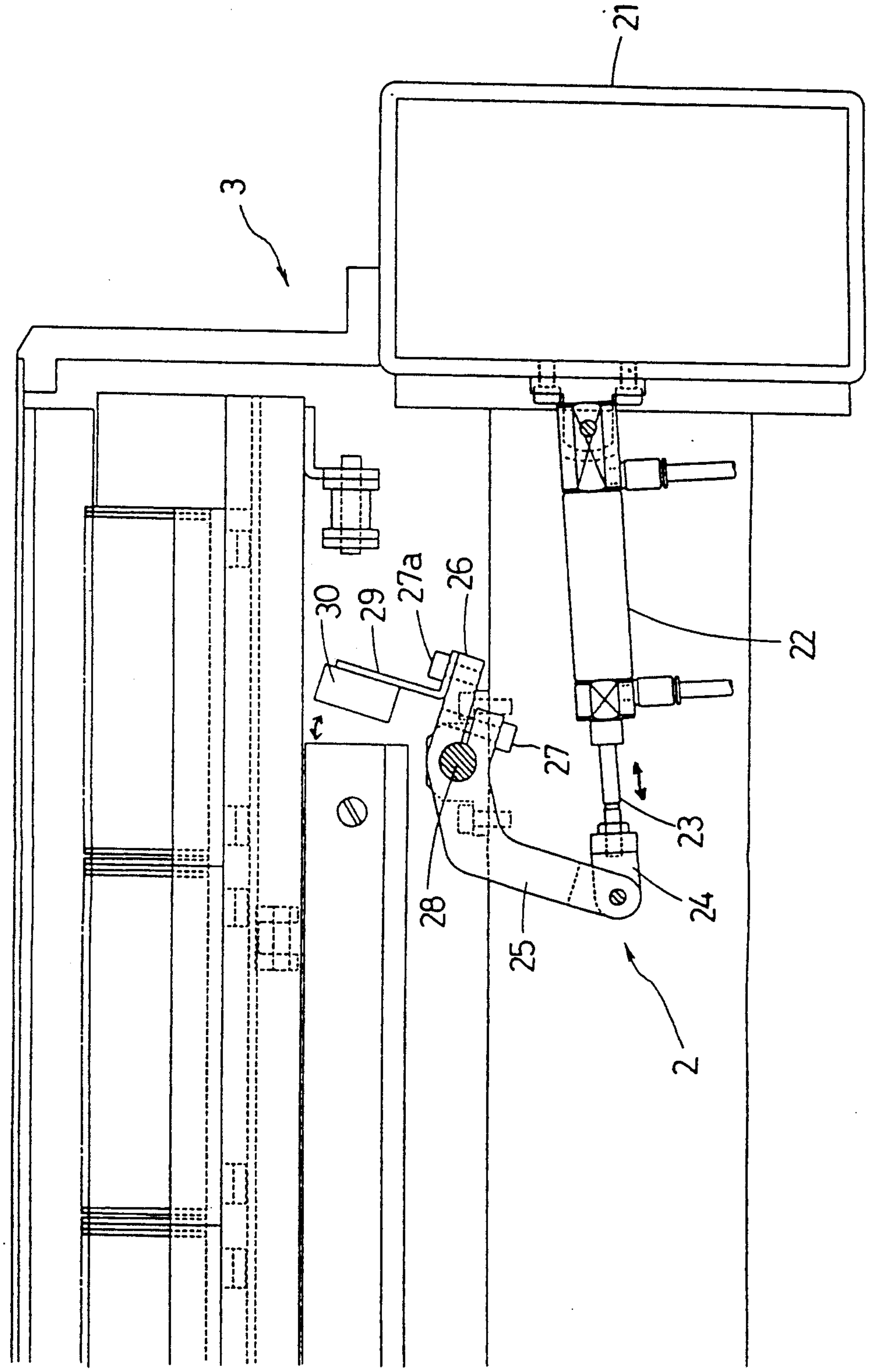
FIG. 6 is explanatory of the leak-preventive-device securing members installed on both sides of the automatic sheet cutting apparatus related to an embodiment of the invention.
Figure 7:
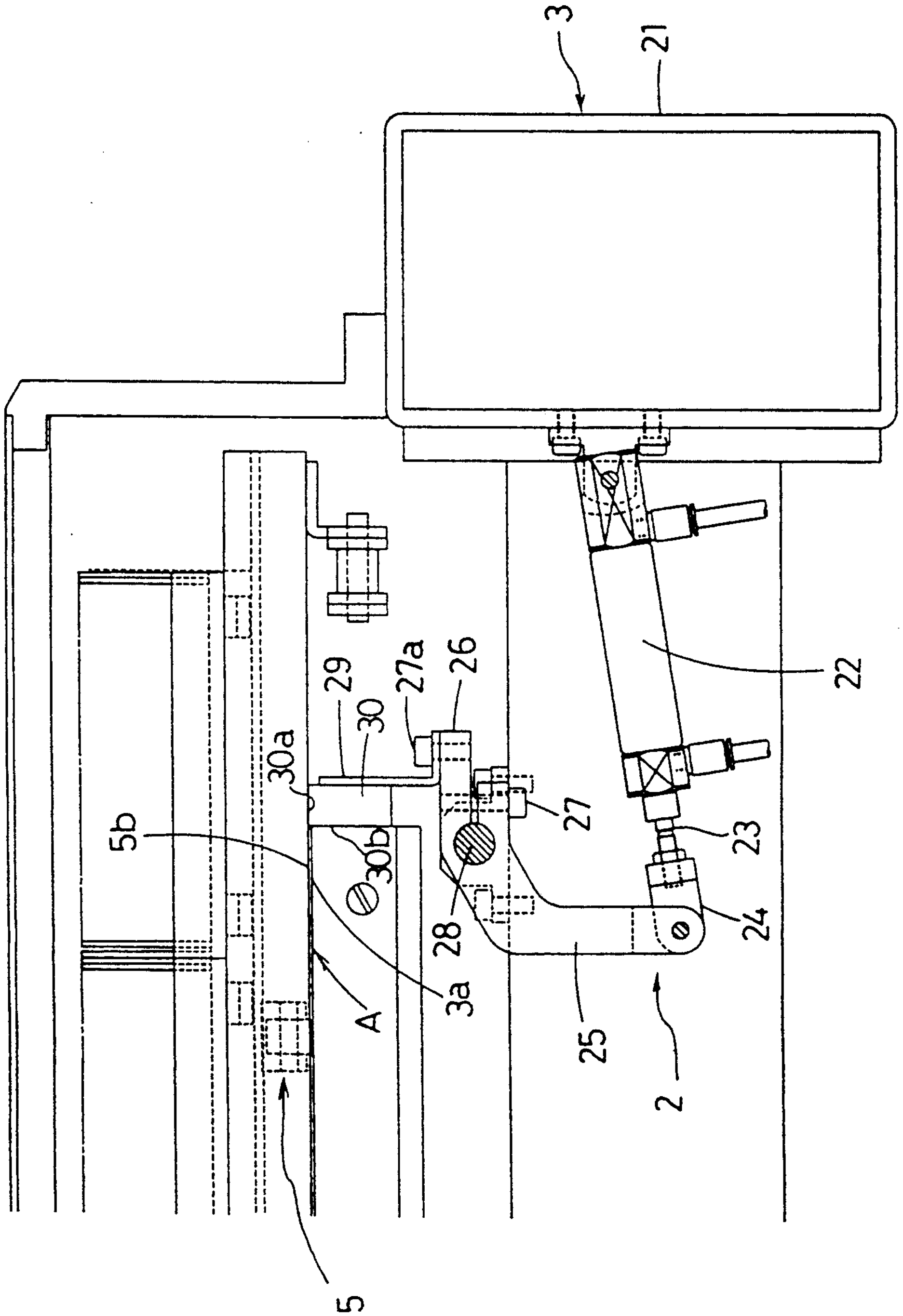
FIG. 7 is explanatory of the operating aspect of the pneumatic cylinder installed to the leak-preventive-device securing members installed on both sides of the automatic sheet cutting apparatus related to an embodiment of the invention.

Furthermore, as shown in FIGS. 6 and 7, a plurality of vacuum-air leakage preventive devices 2 are also installed on both sides of the main body 3 of the automatic sheet cutting apparatus 1. For explanatory convenience, the following description solely refers to a single unit of the vacuum-air leakage preventive device 2.

Concretely, a vertical member 21 is installed along both sides of the upper portion of the main body 3 of the automatic sheet cutting apparatus 1. The rear end of a pneumatic cylinder 22 is secured to the vertical member 21. A connecting member 24 is secured to the tip of a rod 23 of the pneumatic cylinder 22, and yet, an end of a swing lever 25 is pivotally connected to the connecting member 24. A supporting portion 26 is formed at the other end of the swing lever 25 at a predetermined angle. The supporting portion 26 is connected to a rotatable supporting shaft 28 provided for the main body 3 of the automatic sheet cutting apparatus 1 by means of a bolt or screw 27. An L-shaped member 29 is secured to the top surface at the tip of the supporting member 26 by means of a bolt or screw **27*a*. A clearance shielding member 30 is installed on the lateral surface of the L-shaped member 29**

By virtue of the provision of the above-identified vacuum-air leakage preventive devices 2 on both sides of the main body 3 of the automatic sheet cutting apparatus 1, concurrent with the stoppage of the rotation of a pair of endless chains 4 which are respectively provided with a number of brush-mounting bases 5 aligned in parallel with each other, the pneumatic cylinder 22 is activated to project the rod 23, and then, in association with this operation, the connecting member 24, the swing lever 25, and the supporting member 26 respectively start to operate. As a result, the clearance shielding member 30 secured to the supporting member 26 via the L-shaped member 29 shifts itself from both side directions of the clearance "A" between the top surface **3*a* of the main body 3 of the automatic sheet cutting apparatus 1 and the bottom surface 5*b* of a number of brush-mounting bases 5 aligned on those endless chains 4 in parallel with each other. This in turn permits the top surface 30*a* of the clearance shielding member 30 to come into contact with the bottom surface 5*b* of the stopped brush-mounting base 5, and yet, causes the lateral surface 30*b* of the clearance shielding member 30** to come into contact with the top surface of the main body 3 of the automatic sheet cutting apparatus 1. In consequence, the clearance "A" is securely shielded by the clearance shielding member 30 so that the vacuum is not lost.

What is claimed to be secured by United States Letter Patent:

1. A vacuum-air leakage preventive device combined with an automatic sheet cutting apparatus which comprises the following: a main body for said automatic sheet cutting apparatus, a number of brush-mounting bases for holding a cuttable sheet thereon, each of said bases is suspended in parallel with each other at predetermined intervals on a pair of endless chains installed on opposite sides of said automatic sheet cutting apparatus; a plurality of rollers are provided for each of said brush-mounting bases to shift each of said brush-mounting bases by rolling along a top surface of the main body of said automatic sheet cutting apparatus in association with rotation of said endless chains; a plurality of brushes which are respectively secured to said bases for integrally forming a surface for holding the cuttable sheet thereon, each of said bases is provided with a bottom surface and a plurality of air vents and each of said brushes is composed of a number of vertically erected rigid hairs; at least one suction unit available for pneumatically attracting the cuttable sheet on said sheet-holding surface, said at least one suction unit is installed below said brush-mounting bases; and a cutter unit which is movably installed above said sheet-holding surface for free movement to a predetermined position in order to cut said sheet on said surface into a predetermined shape; said vacuum-air leakage preventive device comprises a plurality of movable clearance shielding means in a vicinity of an end of each of said endless chains and operative relative to said brush-mounting bases in a stopped position in order that a clearance between the top surface of the main body of said automatic sheet cutting apparatus and the bottom surface of one of said brush-mounting bases stopped at one end of said endless chains is properly closed.

2. A vacuum-air leakage preventive device combined with an automatic sheet cutting apparatus as in claim 1, wherein said plurality of clearance shielding means of said vacuum-air leakage preventive device are on opposite ends of said automatic sheet cutting apparatus in order that a clearance between the top surface of the main body of said automatic sheet cutting apparatus and the bottom surface of at least one of said brush-mounting bases is closed.

3. A vacuum-air leakage preventive device as set forth in claim 2, in which each of said clearance shielding means includes a movable arm, a clearance swing lever pivotable on a shaft, a shielding member secured onto said pivotable lever for movement by said movable arm into a vacuum tight position relative to said top surface of said main body and said bottom surface of said at least one brush mounting base.

4. A vacuum-air leakage preventive device as claimed in claim 3 in which said vacuum-air leakage preventive device is positioned at opposite ends of said cutting apparatus relative to said brush-mounted bases and includes a transverse frame member positioned below an end of said main body, a pneumatic cylinder secured at one end to said transverse frame member, a connecting member which connects said pneumatic cylinder to said movable arm, said pivotable lever is formed by an L-shaped member secured to a top surface of said movable arm, and said shielding member is secured to a lateral surface of said L-shaped member, wherein upon stopping of the pair of endless chains and said brush-mounting bases, said shielding member is rotated into a vacuum-tight fit with said top surface (3A) of the main body and the bottom surface of said one brush-mounting base (5).

5. A vacuum-air leakage preventive device as set forth in claim 4 which includes a a second plurality of clearance shielding means on each side of said main body, each of said second plurality of clearance shielding means having a shielding member in a vacuum-tight fit with the top surface of the main body and the bottom surfaces of a plurality of said brush-mounting bases which are aligned in a direction transverse to a longitudinal direction of the main body.

6. A vacuum-air leakage preventive device as set forth in claim 1, in which each of said clearance shielding means includes a movable arm, a clearance swing lever pivotable on a shaft, a shielding member secured onto said pivotable lever for movement by said movable arm into a vacuum tight position relative to said top surface of said main body and said bottom surface of said one brush mounting base.

7. A vacuum-air leakage preventive device as claimed in claim 6 in which said vacuum-air leakage preventive device is positioned at opposite ends of said cutting apparatus relative to said brush-mounted bases and includes a transverse frame member positioned below an end of said main body, a pneumatic cylinder secured at one end to said transverse frame member, a connecting member which connects said pneumatic cylinder to said movable arm, said pivotable lever is formed by an L-shaped member secured to a top surface of said movable arm, and said shielding member is secured to a lateral surface of said L-shaped member, wherein upon stopping of the pair of endless chains and said brush-mounting bases, said shielding member is rotated into a vacuum-tight fit with said top surface (3A) of the main body and the bottom surface of said one brush-mounting base (5).

8. A vacuum-air leakage preventive device as set forth in claim 7 which includes a second plurality of clearance shielding means on each side of said main body, each of said second plurality of clearance shielding means having a shielding member in a vacuum-tight fit with the top surface of the main body and the bottom surfaces of a plurality of said brush-mounting bases which are aligned in a direction transverse to a longitudinal direction of the main body.

* * * * *